UNITED STATES PATENT OFFICE.

VINCENT CRANE RICHMOND, OF HARROW-ON-THE-HILL, ENGLAND.

GAS-STOPPING LINING FOR USE IN AIRCRAFT AND MEDIUM FOR FIXING SAME.

1,378,804.　　　　Specification of Letters Patent.　　Patented May 17, 1921.

No Drawing.　　Application filed February 10, 1921. Serial No. 443,996.

*To all whom it may concern:*

Be it known that I, VINCENT CRANE RICHMOND, a subject of the King of the United Kingdom of Great Britain and Ireland, residing at 5 Peterborough road, Harrow-on-the-Hill, in the county of Middlesex, England, have invented certain new and useful Improvements in and Relating to Gas-Stopping Linings for Use in Aircraft and Mediums for Fixing the Same, of which the following is a specification.

This invention relates to gas-stopping linings for fabrics for use in aircraft, for example, as coatings for the ballonnets of air-ships and to media for fixing such linings.

The essentials of such linings are that they must have a very low permeability to gases, particularly to hydrogen and that they must be very light and very flexible and be capable if desired of being applied to rubber surfaces such as the surfaces of cloth which has received a thin proofing of rubber.

It is to be understood that the invention does not relate to reinforced films but to fabrics to which films of celluloid or other gas-stopping material are added.

The first part of the present invention consists in the application as such linings of light flexible films or skin having a very low permeability to gases and produced by processes comprising applying a solution of a suitable substance or of suitable substances to a smooth surface to form a thin coating thereon and allowing the same to set and subsequently removing the same from said surface in the form of a film or skin. Such processes may be new or old. For instance, the well-known film-producing processes may be employed in which the solution is applied to the smooth surface by pouring, dipping or painting operations. I prefer, however, to use as linings films produced by spraying the solution on to the smooth surface.

As regard the composition of the films the same may be new or old but I prefer to use composite films that is, films having two or more layers. Preferably, films having three layers are employed, the central layer being the gas-stopping layer, one of the outer layers a protective layer for protecting the central layer from moisture in the atmosphere, for example, and the other of the outer layers being an attachment layer for enabling the central layer to be fixed to the surface to which it is to be applied without being damaged by the adhesive medium. Said attachment layer also acts as a protective layer.

The class of film which I prefer to employ is new and comprises a central gas-stopping layer preferably containing gelatin or gelatin glue as its more important constituent as regards low permeability to hydrogen, a protective layer preferably comprising nitro-cellulose and an attachment layer comprising rubber. The protective layer may with advantage be formed from a mixture of nitro-cellulose, butyl acetate, naphtha and, if desired, castor oil, to give flexibility. The central layer preferably contains glycerin in addition to the gelatin or gelatin glue. The attachment layer preferably chiefly consists of nitro-cellulose in addition to the rubber the chief purpose of which is to enable the attachment layer readily to be attached to surfaces containing rubber, such as the rubber-proofed surfaces of the cloth used for the ballonnets of airships.

Another part of this invention relates to adhesive media for fixing to rubber containing surfaces of aircraft gas-stopping linings having an attachment layer comprising nitro-cellulose and rubber. Adhesive media according to this part of the invention comprise a solvent of nitro-cellulose, for example, butyl acetate, and a solvent of rubber, for example, naphtha, and rubber.

In this specification films or material of low permeability to hydrogen will be referred to as low permeability films or material.

The preferred form of film for use as a ballonnet lining will now be described by way of example, said film being a new film, and the method of production apart from the constituents employed being a new method and being the method which when used in the manufacture of films for use as the linings of air-craft forms part of the present invention.

On to a clean highly polished glass sheet there is sprayed the following mixture, viz.:—

| | |
|---|---:|
| Nitro-cellulose jelly | 200 lbs. |
| Butyl acetate | 40 gallons. |
| Naphtha | 36 gallons. |
| Castor oil | 8 gallons. |

The temperature at which this mixture is sprayed is preferably 75° F. and the limits are preferably 60° F. and 100° F. The glass and layer are then preferably allowed to stand in a dust-free atmosphere without drafts for about 6 hours in order to become dry. After this first layer has become substantially dry, the second layer consisting of the following mixture is applied, the application preferably being made by dipping the glass and adherent first layer into the mixture. Said mixture or solution is as follows:—

Gelatin _____ 5½ lbs.
Water _____ 5½ gallons.
Glycerin _____ 45 fluid oz.

The gelatin employed is preferably gelatin glue for the sake of cheapness and distilled water is preferably used. After the dipping operation the bulk of the superfluous solution is allowed quickly to drain off, the glass being inclined at a suitable angle to enable a layer of substantially uniform thickness to be formed. This layer may be allowed 24 hours to dry.

After the second layer has become substantially dry, the third layer is formed by applying, preferably by spraying, the following mixture:—

Nitro-cellulose jelly_____ 200 lbs.
Butyl acetate_____ 40 gallons.
Naphtha _____ 36 gallons.

To which mixed three ingredients is added their own bulk of butyl acetate which thinned solution is hereinafter termed "R1 solution." To form the mixture for the third layer there are taken:—

R1 solution_____ 32 fluid oz.
Rubber solution_____ 13 fluid oz.
Naphtha _____ 6 fluid oz.
Castor oil_____ 1 fluid oz.

Said rubber solution is composed as follows:—

India rubber_____ 8.5 parts by weight.
Naphtha _____ 91.5 parts by weight.

This third layer is preferably allowed 24 hours to dry, but in all cases it will be understood that the drying operation may be accelerated by a heating operation. After the third layer has become dry the composite film is peeled off.

The film thus formed of three layers has a permeability for hydrogen of approximately half a liter per square meter per twenty-four hours both before and after it has been subjected to severe crumpling, and its weight may be approximately 70 grms. per square meter. The adhesive medium employed for fixing the film thus formed to the ballonnets of rigid airships may be a pure rubber solution but is preferably a mixture consisting of:—

Rubber solution_____ 8 fluid oz.
R1 solution_____ 2 fluid oz.

the rubber solution being substantially as specified above. In this film the central layer or heart acts as a gas-stopper and is hygroscopic, the first layer formed protects the heart from moisture and enables the film to be stripped from the glass, while the layer last applied also protects the heart and presents an outer surface capable of being readily stuck to a ballonnet fabric.

According to other examples of methods according to my invention I proceed by way of example as follows, viz.:—

I spray a thin solution of rubber and di-nitro cellulose in suitable proportions, which solution is preferably at a temperature of about 60° C. on to a highly glazed surface. The solvent is naphtha and amyl acetate in suitable proportions, to which may be added if desired a certain percentage of castor oil, the object of the latter being to give increased flexibility. The glazed surface may be of any material, subject to its being of such a nature that it is not acted on by the solvents used. The solution is sprayed by means of atomizing apparatus, and the solution is sufficiently thin to allow the drops to freely coalesce and form a continuous film, filling up by its flow any depressions or unevennesses temporarily existing in the film surface. It is important that the glazed surface be clean and that the spraying be carried out in a dust free atmosphere. The thickness of the film to be formed is best regulated by using a solution of constant density, and forming in the first instance as thin a film as possible, having in view sufficient strength to enable it to be stripped and handled. It may then be thickened by respraying over its surface, and repeating the process, allowing sufficient intervals for the film to become dry, until the desired thickness has been obtained. As soon as a film has been sprayed it should be allowed to begin to set by natural evaporation, when the rate of drying may be hastened by the application of a gentle heat. The film may be stripped from its support by immersing it in water at a temperature between 60° and 100° C., and I find in practice that a temperature of about 80° C. is satisfactory. It is important that the water should be free from suspended matter.

I may build up a composite film, consisting of separate films as above described, superimposed one above the other, and made to adhere either by simple application of pressure at ordinary temperature or by the use of an adhesive solution consisting of rubber dissolved in naphtha and amyl acetate, the adhesive solution may be brushed or sprayed on to the film when it is allowed to dry and become tacky, the next film then being pressed on to the prepared surface.

A suitable adhesive solution is as follows:—

| | |
|---|---|
| India rubber | 5.5 |
| Naphtha | 83.5 |
| Amyl acetate | 11. |
| | 100 |

The addition of the amyl acetate to the above solution is made in order to free the rubber in the film from its surrounding nitro-cellulose, which is slightly dissolved on the surface thereby, allowing the rubber in the adhesive solution to adhere strongly to the rubber contained in the film. Any number of films may be superimposed to build up any desired thickness in this way.

The solution of rubber and di-nitro cellulose may for example be prepared as follows:—

I incorporate with a solution of nitro-cellulose in amyl acetate rubber dissolved in naphtha, which solutions are formed first of all separately and then mixed together in certain proportions, to which mixture I may add a certain percentage of castor oil.

I have found that it is desirable to keep the solutions thin, that the rubber solution should be added to the gun cotton solution, and the castor oil if required added to the mixture.

The nitro-cellulose employed should be one that is completely soluble in the mixture of amyl acetate and alcohol. The solvents of the nitro cellulose and rubber should be entirely free from water.

The solutions may have the following compositions:—

*Nitro-cellulose solution.*

| | | |
|---|---|---|
| Nitro-cellulose | 4.5 | parts by weight. |
| Amyl acetate | 59.0 | " " " |
| Coal tar naphtha | 36.5 | " " " |
| | 100 | |

*Rubber solution.*

| | | |
|---|---|---|
| India rubber | 8.5 | parts by weight. |
| Naphtha | 91.5 | " " " |
| | 100 | |

I add to 64 parts of the above nitro-cellulose solution 24 parts of the rubber solution, and 12 parts of naphtha to make up 100 lbs. solution.

I may then add, if greater flexibility is required, from 4 to 6 parts of refined castor oil. This solution when sprayed by a suitable atomizer on to a highly glazed surface will set into a coherent nonporous film which after drying may be easily stripped from its support by immersing in hot water.

In commercial working the film may be prepared by continuously spraying on to a glazed support, such as a band of steel or other suitable material. As soon as the band has left the atomizing nozzles through which the spraying is performed, a sufficient distance to allow of the film beginning to set, it will pass between steam heated rollers or other similar device by which the band is gently heated to hasten the rate of drying. During this period two bands or tapes may be attached by pressure to the edges of the film to give temporarily increased support for stripping the film and for its further treatment as described below.

After the film is dry the band carries it to a hot water bath where the film is stripped; it then passes through drying ovens or other similar apparatus where it is thoroughly dried, and may then be finally wound on to a roll between layers of non-adhesive material. It may be dusted with French chalk or other suitable material to diminish the risk of adhesion.

When composite films are required, several films prepared as above described may be superimposed after the final drying, passed between rollers which apply a gentle pressure causing the films to adhere. The adhesion may be obtained either by the pressure alone or by spraying between the surfaces of the films the rubber adhesive solution above described, sufficient time interval being allowed between such spraying and the superimposing of the films to allow of the solution becoming tacky, which time may be hastened by the use of gentle heat. The composite film is then finally wound on rolls as above described; the supporting ribbons may be left attached to the film or may be removed during the final operation of winding into rolls.

By the process above described for composite films the identity of each film is preserved.

It will be seen that while the apparatus above described is a suitable one for the operation, I am not limited to this type, but any type of machine may be employed that performs the same functions.

I may if desired cure the films formed as above by any of the processes known at present as cold vulcanizing cures for india rubber.

What I claim is:—

1. A gas stopping lining for fabric comprising a central layer of very low permeability to hydrogen, a protective layer and an attachment layer.

2. A gas-stopping lining for fabric comprising a central layer of very low permeability to hydrogen, a protective layer and an attachment layer including rubber.

3. A lining as defined in claim 1 in which the central layer contains gelatin.

4. A lining as defined by claim 2 in which the central layer additionally contains glycerin.

5. A lining as defined by claim 1 in which the protective layer contains nitro-cellulose.

6. A lining as defined by claim 4 in which the protective layer additionally contains castor oil.

7. A lining as defined by claim 1 in which the attachment layer contains rubber and nitro-cellulose.

8. The combination with a gas-stopping lining including a layer of very low permeability to hydrogen and an attachment layer containing nitro-cellulose and rubber, of an attachment medium comprising a solvent of nitro-cellulose, a solvent of rubber, and rubber.

In testimony whereof, I affix my signature in the presence of two witnesses.

VINCENT CRANE RICHMOND.

Witnesses:
WOODIS PASCAL ROGERS, F. R. H. S.,
E. A. BLUNDELL.